US010815882B2

(12) United States Patent
Marcucci et al.

(10) Patent No.: US 10,815,882 B2
(45) Date of Patent: Oct. 27, 2020

(54) INTEGRATED POWER GENERATION AND COMPRESSION TRAIN, AND METHOD

(71) Applicant: Nuovo Pignone Tecnologie Srl, Florence (IT)

(72) Inventors: Daniele Marcucci, Florence (IT); Paolo Bianchi, Florence (IT); Giuseppe Iurisci, Florence (IT); Giuliano Milani, Florence (IT)

(73) Assignee: Nuovo Pignone Tecnologie Srl, Florence (IT)

( * ) Notice: Subject to any disclaimer, the term of this patent is extended or adjusted under 35 U.S.C. 154(b) by 0 days.

(21) Appl. No.: 15/768,187

(22) PCT Filed: Oct. 17, 2016

(86) PCT No.: PCT/EP2016/074836
§ 371 (c)(1),
(2) Date: Apr. 13, 2018

(87) PCT Pub. No.: WO2017/067871
PCT Pub. Date: Apr. 27, 2017

(65) Prior Publication Data
US 2018/0306109 A1    Oct. 25, 2018

(30) Foreign Application Priority Data

Oct. 20, 2015    (IT) .................. 102015000063612

(51) Int. Cl.
*F02C 3/10* (2006.01)
*F01D 15/10* (2006.01)
(Continued)

(52) U.S. Cl.
CPC ............ *F02C 3/10* (2013.01); *F01D 15/10* (2013.01); *F02C 3/103* (2013.01); *F02C 7/36* (2013.01);
(Continued)

(58) Field of Classification Search
CPC ........ F01D 13/00; F01D 13/02; F01D 13/003; F01D 15/08; F01D 15/10; F01D 15/12; F05D 15/12; F05D 2220/766
(Continued)

(56) References Cited

U.S. PATENT DOCUMENTS

| 2,608,822 A * | 9/1952 | Pavlecka | F02C 9/28 60/39.25 |
| 3,418,806 A * | 12/1968 | Wagner | F01D 21/02 165/95 |

(Continued)

FOREIGN PATENT DOCUMENTS

| EP | 1 712 761 A2 | 10/2006 |
| WO | 2011/094414 A2 | 8/2011 |

(Continued)

OTHER PUBLICATIONS

Italian Search Report and Written Opinion issued in connection with corresponding IT Application No. 102015000063612 dated Jul. 6, 2016.
(Continued)

*Primary Examiner* — Pedro J Cuevas
(74) *Attorney, Agent, or Firm* — Baker Hughes Patent Dept.

(57) ABSTRACT

Disclosed herein is an integrated power generation and load driving system, comprising in combination a multi-shaft gas turbine engine comprising a high-pressure turbine mechanically coupled to an air compressor; and a low-pressure turbine, fluidly coupled to but mechanically separated from the high-pressure turbine and mechanically coupled to an output power shaft wherein the output power shaft is connected to a shaft line an electric generator, mechanically coupled to the shaft line and driven into rotation by the gas turbine engine a rotating load, mechanically coupled to the shaft line and driven into rotation by the gas turbine engine (Continued)

a load control arrangement, configured for controlling at least one operating parameter of the rotating load to adapt the operating condition of the rotating load to process requirements from a process, whereof the rotating load forms part, while the low-pressure turbine and the electric generator rotate at a substantially constant speed.

14 Claims, 6 Drawing Sheets

(51) Int. Cl.
| | | |
|---|---|---|
| F02C 7/36 | (2006.01) | |
| F25J 1/00 | (2006.01) | |
| F25J 1/02 | (2006.01) | |
| H02K 7/18 | (2006.01) | |
| H02P 9/06 | (2006.01) | |
| F25J 3/04 | (2006.01) | |
| H02P 101/25 | (2016.01) | |

(52) U.S. Cl.
CPC ........... *F25J 1/0022* (2013.01); *F25J 1/0281* (2013.01); *F25J 1/0283* (2013.01); *F25J 1/0285* (2013.01); *F25J 1/0287* (2013.01); *F25J 1/0294* (2013.01); *F25J 3/04115* (2013.01); *F25J 3/04127* (2013.01); *F25J 3/04139* (2013.01); *H02K 7/1823* (2013.01); *H02P 9/06* (2013.01); *F05D 2210/14* (2013.01); *F05D 2220/32* (2013.01); *F05D 2220/76* (2013.01); *F05D 2220/766* (2013.01); *F05D 2270/02* (2013.01); *F05D 2270/024* (2013.01); *F05D 2270/061* (2013.01); *F25J 2230/20* (2013.01); *F25J 2240/90* (2013.01); *H02P 2101/25* (2015.01)

(58) Field of Classification Search
USPC .............................................. 290/52; 60/773
See application file for complete search history.

(56) References Cited

U.S. PATENT DOCUMENTS

| | | | | |
|---|---|---|---|---|
| 4,117,343 | A * | 9/1978 | Hoffeins | F02C 6/16 |
| | | | | 290/52 |
| 4,347,706 | A * | 9/1982 | Drost | F01K 3/00 |
| | | | | 290/52 |
| 5,058,373 | A * | 10/1991 | Moore | F01D 13/00 |
| | | | | 60/39.27 |
| 5,069,030 | A * | 12/1991 | Moore | F01D 13/00 |
| | | | | 60/39.27 |
| 5,099,643 | A * | 3/1992 | Moore | F01D 13/00 |
| | | | | 60/39.182 |
| 5,199,256 | A * | 4/1993 | Moore | F01D 13/00 |
| | | | | 60/39.182 |
| 6,750,557 | B2 | 6/2004 | Poteet et al. | |
| 7,526,926 | B2 | 5/2009 | Rasmussen et al. | |
| 7,726,114 | B2 | 6/2010 | Evulet | |
| 8,049,353 | B1 * | 11/2011 | Eng | F01D 15/10 |
| | | | | 290/1 A |
| 8,164,208 | B2 | 4/2012 | Rosson et al. | |
| 8,468,835 | B2 | 6/2013 | DeMoss et al. | |
| 8,959,884 | B2 * | 2/2015 | Hoffmann | F01K 23/10 |
| | | | | 290/1 R |
| 9,488,102 | B2 * | 11/2016 | Santini | F01D 15/10 |
| 9,876,412 | B2 * | 1/2018 | Santini | F02C 7/36 |
| 10,006,315 | B2 * | 6/2018 | Thompson | F01K 23/101 |
| 2006/0150633 | A1 * | 7/2006 | McGinley | F02C 7/275 |
| | | | | 60/773 |
| 2010/0005808 | A1 * | 1/2010 | Nanataki | F02C 9/20 |
| | | | | 60/773 |
| 2010/0150713 | A1 | 6/2010 | Stankovic | |
| 2010/0180604 | A1 * | 7/2010 | Kawai | F23N 5/184 |
| | | | | 60/778 |
| 2011/0304155 | A1 * | 12/2011 | Hoffmann | F01K 23/10 |
| | | | | 290/1 R |
| 2013/0118146 | A1 * | 5/2013 | Nanataki | F02C 9/00 |
| | | | | 60/39.182 |
| 2013/0121846 | A1 | 5/2013 | Gilarranz | |
| 2015/0275703 | A1 * | 10/2015 | Thompson | F01K 23/101 |
| | | | | 60/773 |
| 2015/0345385 | A1 * | 12/2015 | Santini | F01D 15/10 |
| | | | | 290/52 |
| 2016/0105078 | A1 * | 4/2016 | Santini | F02C 7/36 |
| | | | | 290/52 |
| 2017/0248036 | A1 * | 8/2017 | Flavin, II | F01K 23/10 |
| 2018/0142579 | A1 * | 5/2018 | Camprini | F01K 13/02 |
| 2018/0142625 | A1 * | 5/2018 | Findlay | F02C 9/18 |
| 2018/0173214 | A1 * | 6/2018 | Higgins | G05B 23/0272 |
| 2018/0187574 | A1 * | 7/2018 | Kalya | F02C 7/00 |
| 2018/0195405 | A1 * | 7/2018 | Abrol | F01D 21/003 |
| 2018/0216496 | A1 * | 8/2018 | Smith | F02C 3/04 |
| 2018/0340473 | A1 * | 11/2018 | Agrawal | F02C 9/42 |
| 2018/0347408 | A1 * | 12/2018 | Collins | F01K 23/101 |

FOREIGN PATENT DOCUMENTS

| | | |
|---|---|---|
| WO | 2013/014198 A1 | 1/2013 |
| WO | 2014/020104 A1 | 2/2014 |
| WO | 2014/072433 A1 | 5/2014 |
| WO | 2014/102127 A1 | 7/2014 |

OTHER PUBLICATIONS

International Search Report and Written Opinion issued in connection with corresponding PCT Application No. PCT/EP2016/074836 dated Jan. 18, 2017.

International Preliminary Report on Patentability issued in connection with corresponding PCT Application No. PCT/EP2016/074836 dated Apr. 24, 2018.

* cited by examiner

INTEGRATED POWER GENERATION AND COMPRESSION TRAIN, AND METHOD

BACKGROUND OF THE INVENTION

The disclosure relates to gas turbine engines in mechanical drive and power generation applications.

Gas turbine engines are commonly used to drive rotating equipment, such as electric generators and turbomachines. In some embodiments, gas turbine engines are used to produce mechanical power, which is used to rotate an electric generator. This latter converts mechanical power into electric power, which is in turn used to power an electric motor. The electric motor drives into rotation a rotating load, such as a pump or a compressor.

An arrangement of this kind, wherein the rotating load includes a gas compressor, is disclosed in US2013/0121846. The compressor rotates at variable speed, depending upon needs of the process, whereof the compressor forms part. The speed of the gas turbine engine varies to control the output frequency of the electric generator and thus the rotation speed of the motor, which in turn rotatingly drives the compressor.

Systems of this kind are often used in off-shore applications, where compressor trains process a refrigerant fluid, used to liquefy natural gas for transportation purposes. The natural gas is extracted from offshore oil and gas fields and liquefied by means of a natural gas liquefaction plant. Liquefied natural gas (LNG) is then stored in a ship and transported to land, where it is gasified again and distributed through a gas distribution network.

Plants for the production of LNG use one or more refrigeration cycles, where a refrigerant is processed through a thermodynamic cycle to extract heat from the natural gas and discharge the extracted heat in the environment. The refrigerant is compressed by a compressor or compressor train prior to expansion in an expander or a laminating valve. The compressor or compressor train is usually directly driven by a gas turbine engine, or by an electric motor. The electric power to supply the electric motor is generated by an electric generator driven into rotation by a gas turbine engine. Part of the electric power produced by the electric generator can be distributed through an electric power distribution grid to various devices or appliances of the off-shore platform or ship, on which the LNG plant is installed, while a predominant part of the electric power is supplied to the electric motor. A variable frequency driver is used to rotate the electric motor at the required rotational speed, which can be different from the rotational speed of the electric generator and which can vary to follow the needs from the process, whereof the compressor or compressor train forms part.

In the field of oil and gas, carbon dioxide is sometimes injected in an oil or gas field, for recovering hydrocarbons therefrom. Carbon dioxide compressors are usually driven by a gas turbine engine directly, or by an electric motor. Electric power for the electric motor can be generated by an electric generator driven by a gas turbine engine.

The need for two electric machines (the electric generator and the electric motor) has several drawbacks. In particular, conversion from mechanical power to electric power (through the electric generator) and back to mechanical power (through the electric motor) reduces the overall efficiency of the system, due to the inevitable losses in the conversion processes. Moreover, the two electric machines contribute to the footprint of the power installation. This factor is particularly critical in off-shore applications, where the space available is limited. Additionally, the use of two electric machines reduces the availability of the system, since both electric machines are prone to failures, which cause shut-down of the production plant. To increase availability of the system, spare electric machines are required, which means at least one additional electric motor and one additional electric generator shall be available for replacement. The spare machines require further additional space on the off-shore installation and represent a cost.

A need therefore exists, for a power system which has reduced space requirements and enhanced efficiency.

SUMMARY OF THE INVENTION

According to one aspect, disclosed herein is an integrated power generation and load driving system, comprising a multi-shaft gas turbine engine comprised of a high-pressure turbine, mechanically coupled to an air compressor of a gas generator of said multi-shaft gas turbine engine, and a low-pressure turbine, fluidly coupled to but mechanically separated from the high-pressure turbine and mechanically coupled to an output power shaft, wherein the output power shaft is connected to a shaft line. The system further comprises: an electric generator, mechanically coupled to the shaft line and driven into rotation by the gas turbine engine; a rotating load, mechanically coupled to the shaft line and driven into rotation by the gas turbine engine; a load control arrangement, configured for controlling at least one operating parameter of the rotating load to adapt the operating condition of the rotating load to requirements from a process, whereof the rotating load forms part, while the low-pressure turbine and the electric generator rotate at substantially constant speed, which is independent from the speed of the high-pressure turbine.

The load can be a driven turbomachine, such as a compressor or a pump. The turbomachine is configured to process a fluid which circulates in the process, whereof the turbomachine forms part. Thus, the operating parameter controlled by the control arrangement is a parameter, whereupon action on the process fluid depends. For instance, the operating parameter can be the rotation speed or another parameter of the driven turbomachine, whereupon the flow rate of the processed fluid depends. Examples of operating parameters are disclosed later on.

The high-pressure turbine generates power to drive the air compressor of the gas turbine engine. The air compressor, the high-pressure turbine and a combustor therebetween form a gas generator of the multi-shaft gas turbine engine. Since the rotation speed of the gas generator can be controlled independently of the rotation speed of the low-pressure turbine and of the generator, enhanced flexibility of the system is obtained.

Using a two-shaft gas turbine engine allows an electric starter motor and relevant variable frequency driver therefore to be dispensed with.

Additional advantageous features and embodiments of an integrated system according to the present disclosure will be described in greater detail herein below and are set forth in the appended claims, which form an integral part of the present description.

According to a further aspect, disclosed herein is a method of operating an integrated power generation and load driving system, comprising the following steps: rotating the gas turbine engine and the electric generator at a rotation speed, having a speed variation limited by a frequency variation admitted by an electric power distribution grid, whereto the electric generator is electrically coupled;

controlling at least one operating parameter of the rotating load by means of a load control arrangement, to adapt the operating condition of the rotating load to process requirements from a process, whereof the load forms part, without changing the rotation speed of the electric generator.

According to the method disclosed herein, the gas turbine engine is a multiple-shaft gas turbine engine comprised of at least a first shaft, mechanically connecting an air compressor to a high-pressure turbine, and a power shaft drivingly connected to a low-pressure turbine, fluidly coupled to but mechanically separated from the high-pressure turbine, and receiving partly expanded combustion gas therefrom. High-temperature combustion gas generated in a combustor, which receives compressed air from the air compressor and fuel, is partly expanded in the high-pressure turbine to produce mechanical power for driving the air compressor, and partly expanded in the low-pressure turbine to produce mechanical power available on the shaft line.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS OF THE INVENTION

The following detailed description of exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
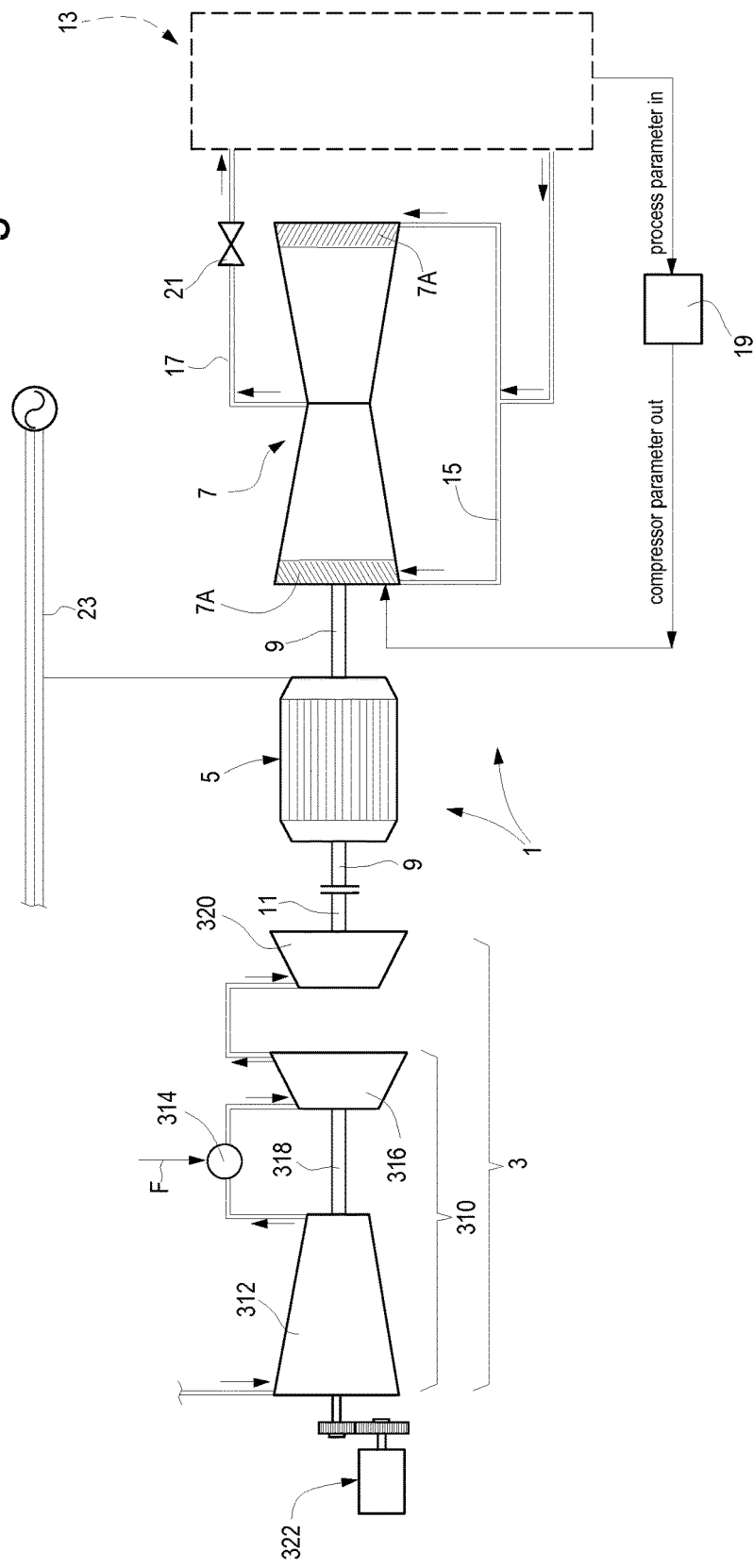
FIG. 1 illustrates a schematic of an embodiment of a power system according to the pre-sent disclosure.

FIG. 1 schematically illustrates one embodiment of an integrated power generation and load driving system 1 according to the present disclosure. The integrated system 1 comprises a multi-shaft gas turbine engine 3, an electric generator 5 and a rotating load. In the embodiment of FIG. 1 the rotating load is a centrifugal gas compressor 7. In other embodiments a different rotating load can be provided, for instance a different compressor technology, such as an axial compressor, or a pump. The load can also include more than one rotating machine. The gas compressor can be arranged for injecting compressed carbon dioxide in an oil or gas field, e.g. in an submarine hydrocarbon field.

A shaft line 9 mechanically connects an output power shaft 11 of the multi-shaft gas turbine engine 3 to the electric generator 5 and to the rotating load, i.e. in this case the gas compressor 7. In the embodiment of FIG. 1, the electric generator 5 is arranged along the shaft line 9 between the multi-shaft gas turbine engine 3 and the gas compressor 7. In other embodiments, as will be described in greater detail later on, a different layout can be provided, with the compressor 7 located between the multi-shaft gas turbine engine 3 and the electric generator 5, for instance. The first arrangement may have some advantages over the second arrangement in certain circumstances. For instance, opening of the compressor casing may be facilitated if the compressor is arranged at the end of the shaft line 9, in case of vertically split compressors. Arranging the electric generator 5 at the end of the shaft line 9, with the compressor 7 being located between the multi-shaft gas turbine engine 3 and the electric generator 5, avoids the need of transmitting the entire mechanical power available from the multi-shaft gas turbine engine 3 through the electric generator shaft, which can be consequently less performing.

The multi-shaft gas turbine engine 3 can be an aero-derivative gas turbine engine, i.e. a gas turbine engine derived from an aeronautical turbo-jet engine.

In exemplary embodiments, the multi-shaft gas turbine engine 3 is a two-shaft gas turbine engine.

The multi-shaft gas turbine engine 3 can comprise a gas generator 310 and a power turbine 320, also referred to as low-pressure turbine. The gas generator 310 in turn comprises an air compressor 312, a combustor 314, a high-pressure turbine 316 and a first shaft 318, which mechanically connects the high-pressure turbine 316 to the air compressor 312. The combustor 314 is fluidly coupled to a delivery side of the air compressor 312 and to an inlet of the high-pressure turbine 316.

The outlet of the high-pressure turbine 316 is fluidly coupled to the power turbine or low-pressure turbine 320. The low-pressure turbine 320 is in turn mechanically coupled to the output power shaft 11 of the multi-shaft gas turbine engine 3. According to the embodiment illustrated in FIG. 1, therefore, the multi-shaft gas turbine engine 3 is a two-shaft gas turbine engine, having a first shaft 318 that connects the high-pressure turbine 316 to the air compressor 312, and a second shaft 11, which receives mechanical power from the low-pressure or power turbine 320.

Reference number 322 indicates a gas turbine starting motor, e.g. a hydraulic motor, which is used to start rotation of the gas generator 310.

As mentioned, the gas compressor 7 can be part of an open circuit, e.g. a carbon dioxide injection circuit. In other embodiments, the gas compressor 7 can be part of a closed circuit, e.g. a refrigeration circuit. In more general terms, the compressor 7 can be part of a process, which is schematically shown at 13. Reference number 15 indicates the suction side and reference number 17 indicates the delivery side of the gas compressor 7, through which the gas compressor 7 is connected to the process 13.

A load control arrangement is provided, which is configured and arranged for adjusting at least one operating parameter of the gas compressor 7, depending upon requests from the process 13. The load control arrangement can comprise a compressor controller, schematically shown at 19, for controlling one or more operating parameters of the gas compressor 7, based on requirements from the process 13. The compressor controller 19 receives an input based on one or more process parameters from the process 13 and generates an output represented by one or more operating parameters for the gas compressor 7.

The load control arrangement can further include one or more devices combined with the gas compressor 7 and which, based on the operating parameter(s), adjust one or more of following: the rotating speed of the gas compressor 7, the compressor suction pressure, the compressor delivery pressure, the pressure ratio of gas compressor 7. Alternatively, or in combination, the load control arrangement can comprise one or more devices which, based on the operating parameter(s), adjust a working gas flow rate processed through the gas compressor 7.

In some embodiments, said devices can include variable inlet guide vanes (shortly variable IGVs) 7A, which can be used to adjust the flow rate of the working gas processed by the gas compressor 7. An input from the compressor controller 19 can be applied to an actuator, which selectively opens and closes the variable IGVs 7A.

In exemplary embodiments, a throttling or laminating valve 21 can be arranged on the delivery side of the gas compressor 7, to adjust the delivery pressure. The throttling or laminating valve 21 can be gradually and selectively opened or closed by an actuator (not shown), which is controlled by an input from the compressor controller 19. Other devices for adjusting operating parameters of the gas compressor 7 will be described in more detail later on, reference being made to other exemplary embodiments.

In general terms, the compressor controller 19 can adjust one or more of the operating parameters of the gas compressor 7, or of any rotating load driven by the multi-shaft gas turbine engine 3 through the shaft line 9, based on requirements from the process 13, such that the rotating load 7 operates at or around the required operating point, without the need to modify the rotation speed of the low-pressure turbine 320 of the multi-shaft gas turbine engine 3 and the electric generator 5. This allows the low-pressure turbine 320 of the multi-shaft gas turbine engine 3 and the electric generator 5 to rotate at a substantially constant rotational speed.

In the present context, the term "substantially constant" means that the speed variation, and thus the electric frequency variation, remains within the range of frequency fluctuation (tolerance range) allowed by an electric power distribution grid 23, whereto the electric generator 5 is connected and which distributes electric power to ancillary devices of integrated system 1, of the process 13, and/or of the ship or off-shore platform, whereon the integrated power system 1 can be located. Tolerance ranges can be within +/−5%, more particularly between +/−2.5%.

The integrated power system 1 described so far operates as follows. Air is compressed by the air compressor 312 of the multi-shaft gas turbine engine 3 and mixed with fuel F in the combustor 314. The air/fuel mixture is burned in the combustor 314 to produce compressed, high-temperature combustion gas. The combustion gas is partly expanded in the high-pressure turbine 316, generating mechanical power to support rotation of the air compressor 312.

The partly expanded combustion gas is further expanded in the power turbine 320. The enthalpy drop of the combustion gas in the power turbine or low-pressure turbine 320 produces additional mechanical power, which is made available on the output power shaft 11 and on shaft line 9, to rotate the electric generator 5 and the compressor 7 or any other rotating load mechanically coupled to the shaft line 9.

The mechanical power available on the output power shaft 11 coupled to the low-pressure turbine 320 of the multi-shaft gas turbine engine 3 is thus converted by the electric generator 5 into electric power and distributed on the electric power distribution grid 23. If and when excess mechanical power is available on the shaft line 9, said excess mechanical power is used to compress the working gas processed through the gas compressor 7.

By operating the electric generator 5 at a fixed rotary speed, determined by the frequency of the electric power distribution grid 23, optimum efficiency is achieved in the electric power production section of the integrated power system 1.

While the shaft line 9 rotates at a substantially constant speed, dictated by the frequency of the electric power distribution grid 23, adjustments of the operating conditions of the compressor 7 required by the process 13, are achieved through control input from the compressor controller 19. For instance, the suction pressure and/or the delivery pressure can be adjusted by acting upon the variable IGVs 7A and/or the throttling or laminating valve 21, or the working gas flow rate can be adjusted acting upon the variable IGVs 7A. As will be described later on, different actions can be taken to further modify one or more operating parameters of the compressor 7, such as the rotation speed, the flow rate or the compression ratio, without affecting the rotation speed of the low-pressure turbine 320 of the gas turbine engine 3 and the rotation speed of the electric generator 5.

The integrated power system 1 has an improved efficiency over current art systems, since mechanical power generated by the multi-shaft gas turbine engine 3 is used to directly drive the compressor 7, without the need for conversion into electric power and then back to mechanical power. Moreover, the low-pressure turbine 320 of the multi-shaft gas turbine engine 3 can be operated at constant speed, thus maximizing the turbine efficiency and generating electric power at substantially constant frequency. As the electric generator 5 rotates at substantially constant speed, it can be directly connected to the electric power distribution grid 23, without the need for electric power conversion, through a variable frequency driver, for instance.

Using a single shaft line 9 with a single electric machine 5 reduces the overall footprint of the system, saving space on the off-shore installation.

By using a two-shaft gas turbine engine 3, the electric generator 5 is not required to operate in an electric motor mode as a starter for the multi-shaft gas turbine engine 3. Start of the multi-shaft gas turbine engine 3 is obtained by first starting the gas generator 310, leaving the power turbine 320, and thus the shaft line 9, inoperative. Starting the gas generator 310 requires only limited power, which can be provided by the starting motor 322, which can be a hydraulic motor.

The electric generator 5 is also not required to operate as a helper motor, since the multi-shaft gas turbine engine 3 is designed or selected such as to provide a power rate sufficient to drive the electric generator 5, and such that surplus mechanical power can be available on the shaft line 9. Said surplus mechanical power, when available, is used to drive the compressor 7.

Figure 2:
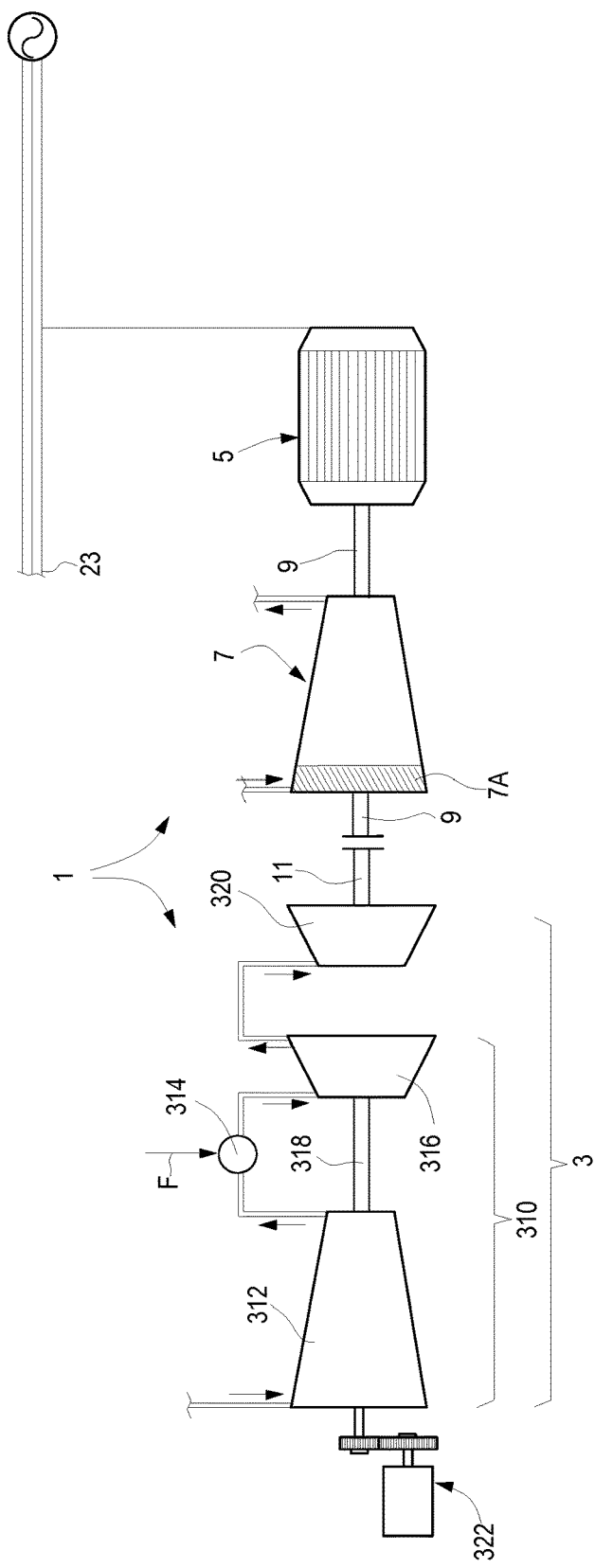
FIGS. 2 to 6 illustrate further embodiments of a power system according to the present disclosure.

Many alternative configurations of the integrated power system 1 described so far are possible. An alternative exemplary embodiment of the integrated power system 1 of the present disclosure is schematically shown in FIG. 2. The same or equivalent components already described in connection with the embodiment of FIG. 1 are indicated with the same reference numbers and will not be described again. The main difference between the embodiment of FIG. 2 and the embodiment of FIG. 1 is the arrangement of the gas compressor 7 and the electric generator 5 along the shaft line 9. In FIG. 2 the gas compressor 7 is arranged between the multi-shaft gas turbine engine 3 and the electric generator 5.

The reversed arrangement of electric generator 5 and gas compressor 7 can be adopted also in at least some of the embodiments disclosed herein after.

Figure 3:
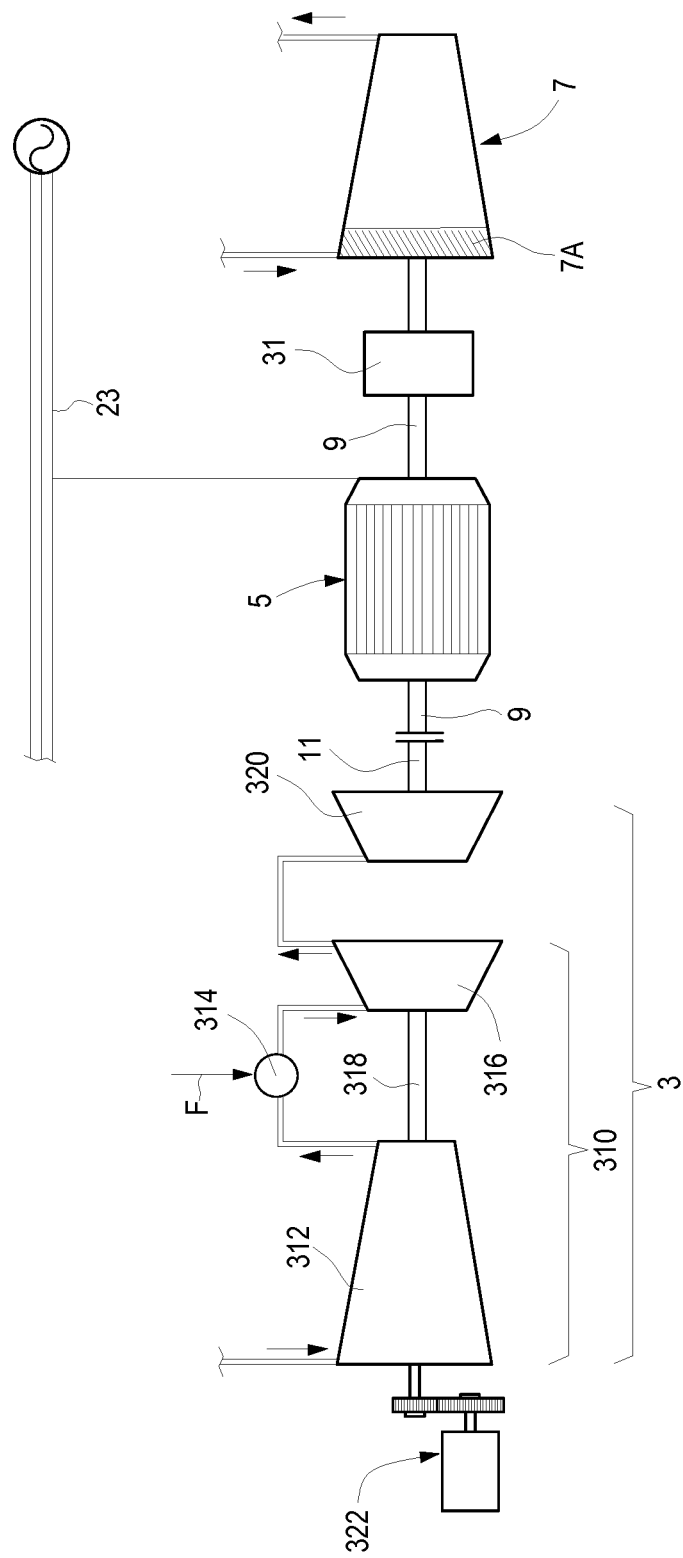

In FIG. 3 the integrated power system 1 is configured substantially as in FIG. 1, but a clutch 31 is arranged along the shaft line 9, between the electric generator 5 and the gas compressor 7. The two driven machines 5 and 7 can thus be uncoupled, for instance if shut down of the gas compressor 7 is required, while electric power generation for the electric power distribution grid 23 shall continue.

Figure 4:
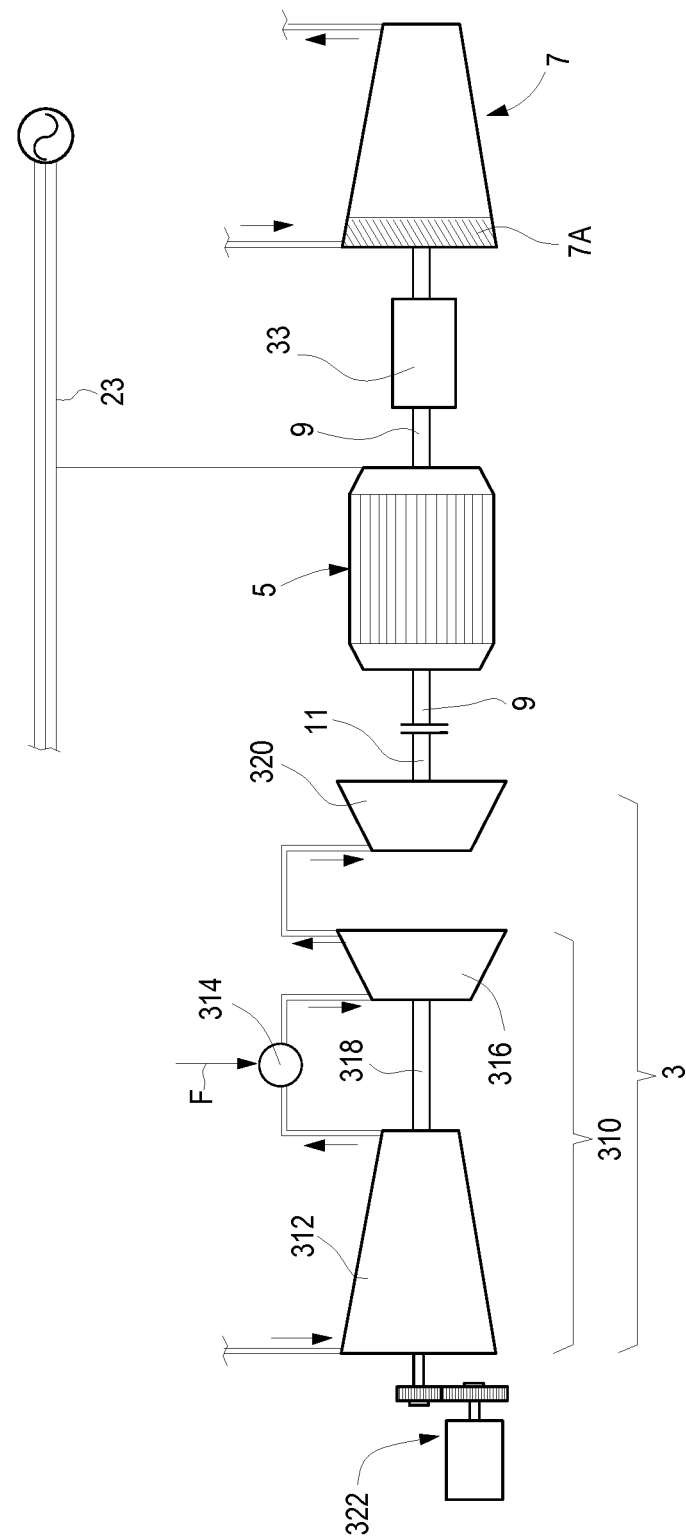

Instead of a simple clutch, a variable speed coupling 33 can be arranged between the electric generator 5 and the gas compressor 7, as shown in FIG. 4. Any suitable variable speed coupling 33 can be used for this purpose, for instance a variable speed planetary gear, such as a Vorecon variable speed drive, available from Voith Turbo GmbH & Co KG, Crallshelm, Federal Republic of Germany.

According to the embodiment of FIG. 4 the speed of the gas compressor 7 can be modified during operation of the integrated power system 1, in response to requests from the process 13, without changing the speed of the electric generator 5. The speed variation allowed by the variable speed coupling 33 can be combined with other variable parameters of the gas compressor 7, such as pressure and flow rate. The speed ratio between an input shaft and an output shaft of the variable speed coupling 33 can be selectively controlled by the compressor controller 19.

Therefore, in the embodiment of FIG. 4 a portion of the shaft line 9 has a rotation speed which is maintained around a constant value, dictated by the frequency of the electric power distribution grid 23. This section of the shaft line 9 extends from the output shaft 11 of the multi-shaft gas turbine engine 3 to the inlet of the variable speed coupling 33. The remaining part of the shaft line 9, from the outlet of the variable speed coupling 33 to the gas compressor 7, rotates at a variable speed, which can be different from the rotary speed of the low-pressure turbine 320 of the gas turbine engine 3 and of the rotary speed of the electric generator 5.

Typically, a gas plant, for instance an LNG plant, includes several secondary gas processes and circuits which can require a pressure reduction step. Usually, this is achieved through a gas lamination step, with the energy of gas being wasted, or with a stand-alone turboexpander train (turboexpander+generator). In this case, the electric power generated by expanding the gas in the turboexpander is made available to the electric power distribution grid 23. According to some embodiments of the subject matter disclosed herein, instead of using a stand-alone turboexpander and electric generator train, the turboexpander can be integrated in the integrated power system 1, as schematically shown in FIG. 5, wherein the same parts and components already described in the previously mentioned embodiments are labeled with the same reference numbers and will not be described again.

Figure 5:
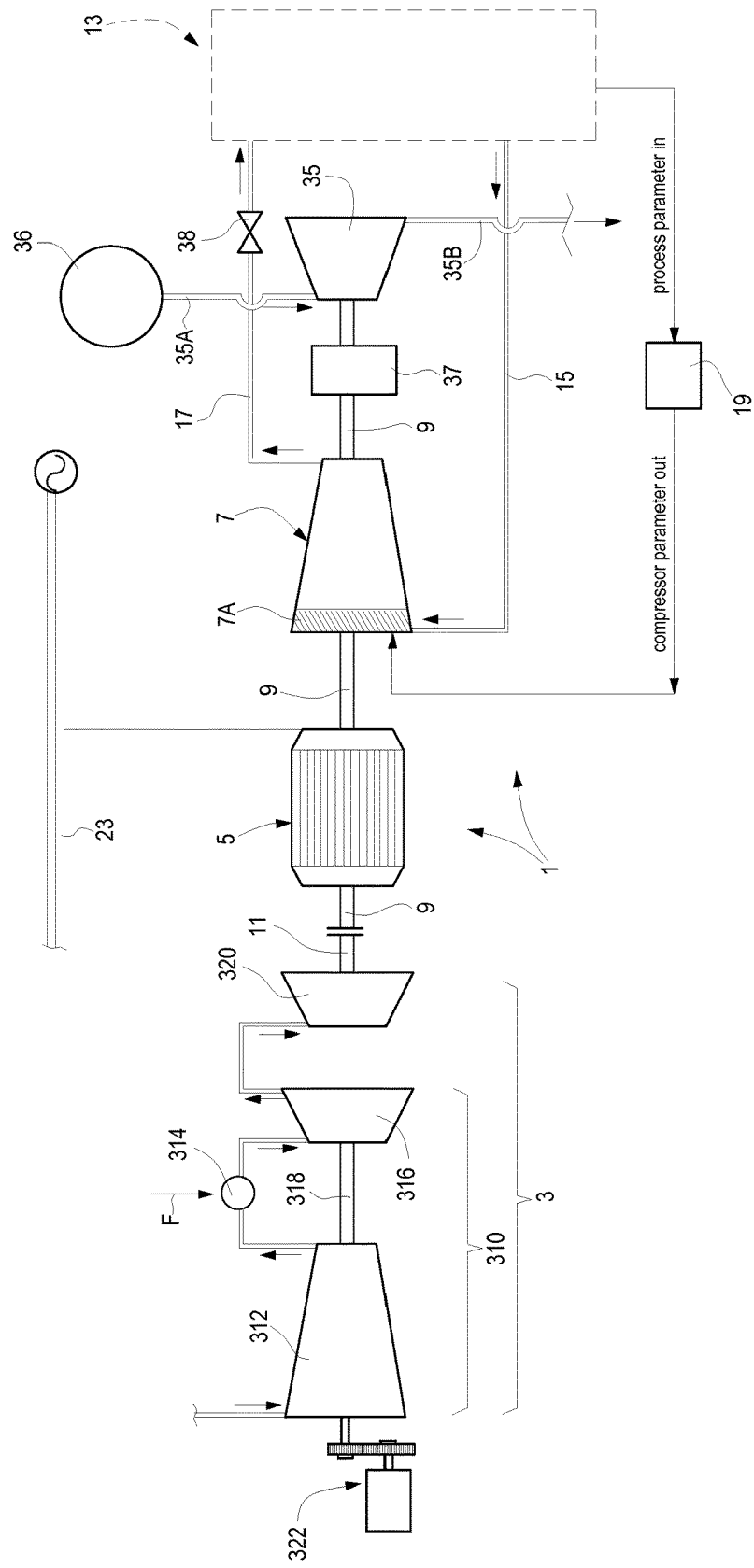

In FIG. 5 a turboexpander 35 is arranged on the shaft line 9. A clutch 37 can be arranged to mechanically disconnect the turboexpander 35 from the shaft line 9.

The turboexpander 35 has an inlet 35A and an outlet 35B. A pressurized working fluid, e.g. a pressurized gas which requires a pressure reduction, flows from a high-pressure fluid source, generically shown at 36, through the turboexpander 35. Mechanical power generated by the pressure reduction in the gas flow is made available on the shaft line 9 and exploited to supply driving power either to the gas compressor 7, or the electric generator 5, or both, thus contributing to the overall efficiency of the integrated power system 1. If no gas flows through the turboexpander 35, the latter can be mechanically disconnected from the shaft line 9 by disengaging the clutch 37, such that the integrated power system 1 can operate leaving the turboexpander 35 inoperative.

The turboexpander 35 of FIG. 5 can be used also in the embodiments of FIGS. 1 to 4.

By integrating the turboexpander 35 in the integrated power system 1, further advantages are obtained with respect to configurations where the turboexpander is coupled to a separate electric generator. Less power conversion steps are needed, and the additional electric generator coupled to the turboexpander is dispensed with, thus further reducing the footprint and cost of the installation.

Figure 6:
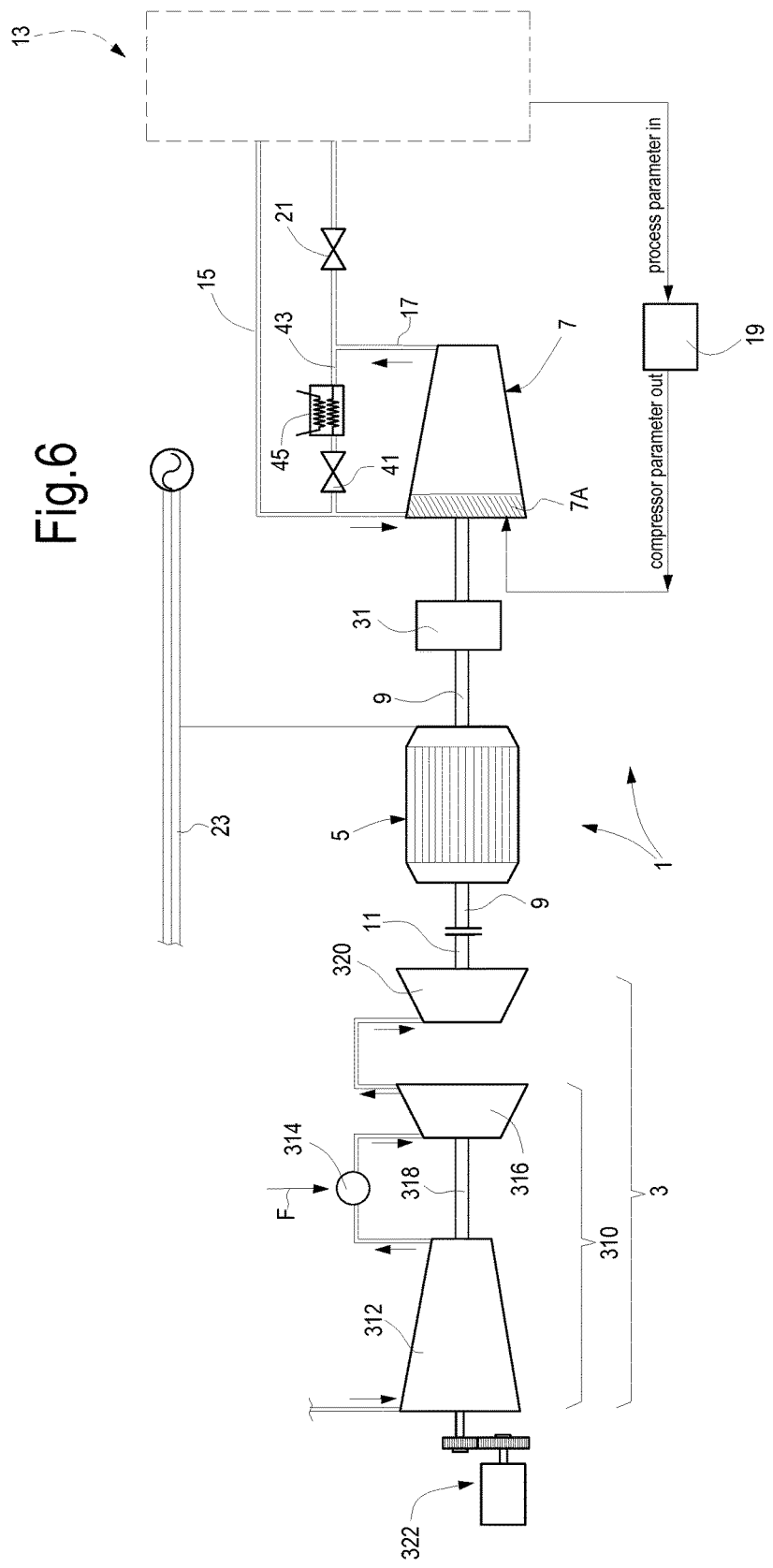

A yet further embodiment of an integrated power generation and load driving system 1 according to the present disclosure is illustrated in FIG. 6. The same reference numbers designate the same or equivalent components disclosed in connection with FIGS. 1 to 5 and which will not be described again. The embodiment of FIG. 6 is similar to the embodiment of FIG. 1. A by-pass valve 41 is additionally provided along a by-pass line 43 arranged between the delivery side and the suction side of the gas compressor 7. A heat exchanger 45 can also be provided between the delivery side of the gas compressor 7 and the by-pass valve 41.

In some embodiments the by-pass valve 41 can be an anti-surge valve of the compressor 7.

The by-pass valve 41 can be under the control of the compressor controller 19 and can be used to recirculate part of the working gas processed by the gas compressor 7, such that the flow rate delivered by the gas compressor 7 to the process 13 can be modified according to requirements from the process 13, without influencing the rotation speed of the electric generator 5 and of the low-pressure turbine 320 of the multi-shaft gas turbine engine 3. The by-pass line 43 and relevant by-pass valve 41 can be provided in combination with variable IGVs 7A and/or other devices for modifying the operating conditions of the gas compressor 7, such as a throttling or laminating valve 21 or a turboexpander 35 as illustrated in FIG. 5. Additionally, instead of a clutch 31, a variable speed coupling 35 can be arranged between the gas compressor 7 and the electric generator 5.

The operation of the integrated power system 1 of FIGS. 2 to 6 is substantially the same as described in connection with FIG. 1, except that additional operating parameters of the gas compressor 7 can be controlled, such as the flow rate through the turboexpander 35, or the rotation speed.

Depending upon the available devices associated with the gas compressor 7, or any other rotation load connected to the shaft line 9, different actions can be taken to modify the operating point of the gas compressor 7 in response to requests from the process 13, without influencing the rotation speed of the low-pressure or power turbine 320 of the multi-shaft gas turbine engine 3 and the rotation speed of the electric generator 5.

Numerous additional combinations and modifications of the integrated power generation and load driving system 1 of the present disclosure are possible. For instance, one or more gear boxes can be provided along the shaft line 9, between the rotating machines arranged there along. If the electric generator 5 is disposed between the low-pressure turbine 320 of the multi-shaft gas turbine engine 3 and the gas compressor 7, a gear box can be arranged between the low-pressure turbine 320 of the multi-shaft gas turbine engine 3 and the electric generator 5, and/or between the electric generator 5 and the gas compressor 7, or another rotating load. If the gas compressor 7 is arranged between the multi-shaft gas turbine engine 3 and the electric generator 5, a gear box can be arranged between the multi-shaft gas turbine engine 3 and the gas compressor 7, and/or between the gas compressor 7 and the electric generator 5.

The use of gearbox(es) allows different steady state rotation speeds for the different driven machines and the low-pressure turbine 320 of the multi-shaft gas turbine engine 3.

Also, while in the above described embodiments reference has been made to a gas compressor 7, a compressor train or a different arrangement of one or more rotating loads can be provided. For instance, the rotating load can include a centrifugal pump or an axial pump. Combinations of different driven turbomachines, such as compressors and pumps on the same shaft line 9 are also possible It shall further be understood that various devices and instrumentalities described in connection with individual embodiments shown in the drawings, can be differently combined to one another. For instance, the by-pass valve 41 illustrated in FIG. 6 can be provided also in the embodiments of FIGS. 1-5 and used as a (further) device for controlling the operating conditions of the gas compressor 7. In other embodiments, one or more of the above described devices can be omitted. E.g. the variable IGVs 7A can be dispensed with, if other means provide sufficient control over the operating parameters of the rotating load 7.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An integrated power generation and load driving system, the system comprising in combination:
   a multi-shaft gas turbine engine comprising a high-pressure turbine mechanically coupled to an air compressor; and a low-pressure turbine, fluidly coupled to but mechanically separated from the high-pressure turbine and mechanically coupled to an output power shaft; the output power shaft being connected to a shaft line;
   an electric generator, mechanically coupled to the shaft line and driven into rotation by the gas turbine engine; and
   a rotating load, mechanically coupled to the shaft line and driven into rotation by the gas turbine engine ; and
   a load control arrangement, configured for controlling at least one operating parameter of the rotating load to adapt the operating condition of the rotating load to process requirements from a process, whereof the rotating load forms part, while the low-pressure turbine and the electric generator rotate at a substantially constant speed that is independent from the speed of high-pressure turbine.

2. The integrated power generation and load driving system of claim 1, wherein the substantially constant speed of the low-pressure turbine of the gas turbine engine and of the electric generator is imposed by an electric frequency of an electric power distribution grid , whereto the electric generator is connected.

3. The integrated power generation and load driving system of claim 1, wherein the load control arrangement is configured and arranged for adjusting one or more of the following parameters: a suction pressure of a working fluid processed by the rotating load a delivery pressure of the working fluid processed by the rotating load; a pressure ratio between a delivery side and a suction side of the rotating load; a working fluid flow rate through the rotating load; a rotation speed of the rotating load.

4. The integrated power generation and load driving system of claim 1, wherein the rotating load is a turbomachine, where through a fluid from said process, whereof the turbomachine forms part, is processed.

5. The integrated power generation and load driving system of claim 1, wherein the load control arrangement comprises one or more of the following: a by-pass valve arranged in parallel to the rotating load and connecting a delivery side and a suction side of the rotating load; a variable inlet guide vane arrangement; a throttling or laminating valve fluidly coupled to a delivery side of the rotating load; a variable speed coupling along the shaft line, between the electric generator and the rotating load, configured and controlled to modify the rotation speed of the rotating load, while the rotation speed of the electric generator remains substantially constant.

6. The integrated power generation and load driving system of claim 1, further comprising a clutch between the electric generator and the rotating load.

7. The integrated power generation and load driving system of claim 1, further comprising a turboexpander mechanically coupled to the shaft line, configured and arranged for receiving a pressurized working fluid from a source of pressurized working fluid and converting pressure energy of the pressurized working fluid into mechanical power available on the shaft line.

8. The integrated power generation and load driving system of claim 7, wherein the turboexpander is mechanically coupled to the shaft line through a clutch.

9. The integrated power generation and load driving system of claim 1, wherein the electric generator is devoid of a motor mode capability.

10. The integrated power generation and load driving system of claim 1, wherein the electric generator is arranged between the gas turbine engine and the rotating load.

11. The integrated power generation and load driving system of claim 1, wherein the rotating load is controlled to rotate at a substantially constant speed.

12. The integrated power generation and load driving system of claim 1, wherein the rotating load is arranged between the gas turbine engine and the electric generator.

13. A method of operating an integrated power generation and load driving system, comprising: a gas turbine engine; an electric generator; a rotating load; a shaft line mechanically coupling the electric generator and the rotating load to the gas turbine engine; the method comprising the following steps:

rotating the gas turbine engine and the electric generator at a rotation speed, having a speed variation limited by a frequency variation admitted by an electric power distribution grid, whereto the electric generator is electrically coupled; and controlling at least one operating parameter of the rotating load by means of a load control arrangement, to adapt the operating condition of the rotating load to process requirements from a process, whereof the rotating load forms part, without changing the rotation speed of the electric generator;

wherein the gas turbine engine is a multiple-shaft gas turbine engine comprised of at least a first shaft, mechanically connecting an air compressor to a high-pressure turbine, and a power shaft drivingly connected to a low-pressure turbine, fluidly coupled to but mechanically separated from the high-pressure turbine, and receiving partly expanded combustion gas therefrom; wherein high-temperature combustion gas generated in a combustor, which receives compressed air from the air compressor and fuel, is partly expanded in the high-pressure turbine to produce mechanical power for driving the air compressor, and partly expanded in the low-pressure turbine to produce mechanical power available on the shaft line.

14. The method of claim 13, wherein the rotating load is a rotating turbomachine, and wherein an operating point of the turbomachine is controlled, in response to process requirements, by acting upon at least one of the following parameters: a suction pressure of a working fluid processed by the rotating load; a delivery pressure of the working fluid processed by the rotating load; a pressure ratio between a delivery side and a suction side of the rotating load; a working fluid flow rate through the rotating load; a rotation speed of the rotating load.

\* \* \* \* \*